United States Patent [19]

Katz

[11] 4,048,345

[45] Sept. 13, 1977

[54] COFFEE PERCOLATION PROCESS

[75] Inventor: Saul Norman Katz, Monsey, N.Y.

[73] Assignee: General Foods Corporation, White Plains, N.Y.

[21] Appl. No.: 654,447

[22] Filed: Feb. 2, 1976

Related U.S. Application Data

[63] Continuation-in-part of Ser. No. 417,312, Nov. 19, 1973, abandoned.

[51] Int. Cl.² ............................................. A23F 1/08
[52] U.S. Cl. ................................. 426/432; 23/272 R; 426/388
[58] Field of Search ........... 23/272 R, 272 AH, 272.5; 426/425–436, 388

[56] References Cited

U.S. PATENT DOCUMENTS

| | | | |
|---|---|---|---|
| 2,009,667 | 7/1935 | Keyes | 23/272 R |
| 2,334,171 | 11/1943 | Carter | 426/432 |
| 2,340,758 | 2/1944 | Kappenberg et al. | 426/432 |
| 2,534,907 | 12/1950 | Ham et al. | 23/272 R X |
| 2,931,728 | 4/1960 | Franck | 426/432 |

OTHER PUBLICATIONS

*Coffee Processing Technology* by Siretz and Foote, published by AUI Pub. Co., Westport, Conn., 1963, pp. 347, 348, 368.

Coffee Processing Technology, vol. 2, by M. Siretz, published by AUI Pub. Co., Westport Conn.; 1963, pp. 171–172.

*Primary Examiner*—Frank W. Lutter
*Assistant Examiner*—N. Greenblum
*Attorney, Agent, or Firm*—Richard Kornutik

[57] ABSTRACT

A percolation process is described wherein it is possible to operate a fixed-capacity percolator set at decreased capacity without experiencing operational difficulties or coffee extract quality loss. The extraction columns of the percolator set are filled with the amount of roasted and ground coffee desired to be extracted and the remainder of the column is filled with an inert packing material.

2 Claims, No Drawings

COFFEE PERCOLATION PROCESS

This is a continuation-in-part of Application Ser. No. 417,312, filed Nov. 19, 1973, now abandonded.

BACKGROUND OF THE INVENTION

This invention relates to coffee and more particularly to a percolation process wherein coffee solids are extracted from roasted and ground coffee to produce a coffee extract which is then further processed to form a dry soluble coffee product.

Percolation is the semi-continuous countercurrent extraction of water soluble coffee solids from roasted and ground coffee. Percolation is performed in a percolation set which is comprised of a series of extraction columns, generally 4 to 6.

At steady-state operation, the extraction columns of the percolator set are filled with roasted and ground coffee of varying degrees of extraction or freshness. An aqueous extraction liquid, generally water, is heated and fed to the entrance of the extraction column containing the most extracted roasted and ground coffee in the percolator set, generally known as the spent stage extraction column. The extraction liquid passes through the spent stage contacting the roasted and ground coffee contained therein and exits the extraction column as a dilute solution of coffee solids. The extraction liquid is then passed to and through the next successive extraction column containing the next most extracted coffee in the percolator set, extracting soluble solids therefrom. In like manner the extraction liquid is passed through successive extraction columns containing progressively fresher or less extracted roasted and ground coffee. The extraction liquid is finally passed through the extraction column containing the least extracted or freshest coffee in the set, generally unextracted coffee, known as the fresh stage extraction column and a predetermined portion of the extraction liquid is drawn off as coffee extract thus completing a cycle. This coffee extract generally contains from 20% to 35% soluble coffee solids by weight and is then further processed to produce a dry soluble coffee product.

A new cycle is begun by taking the spent stage extraction column off-stream and placing a new extraction column generally containing unextracted roasted and ground coffee on-stream thus becoming the fresh stage for draw-off of coffee extract in this cycle. Aqueous extraction liquid is then fed to the spent stage extraction column for this cycle, the coffee contained therein being the next most extracted coffee from the previous cycle, and extraction continues as described above with the extraction liquid contacting progressively fresher roasted and ground coffee.

It can be seen, then, that a given charge of roasted and ground coffee becomes progressively more extracted in each successive cycle.

There are numerous factors that affect the proper loading of a coffee column in preparation for extraction. Some are percolator wall temperature, rate of coffee fill into the percolator column, size and shape of ground coffee bins, uniformity of grinds, and slackness in percolator column fill.

Coarse particles in a free fall tend to roll to the edge of a bin. Fines and chaff settle later in the corners of square bins and at the edges of round bins. This phenomenon occurs in all the bins in which the ground coffee is handled, as well as in the percolator column under gravity fall of ground coffee. Faster filling of a bin or percolator column traps particles as they fall so segregation is minimized. Fast filling of the column is attained by sucking the ground coffee in with air and removing the air from inside the column. The fast fill has the advantage of giving higher coffee loadings in the column by about 10 per cent over gravity fill. Higher coffee column loadings mean higher productivity from the percolator system and a few percent higher extract concentrations. Denser column loadings reduce channeling of extract flow which is more important in larger diameter columns. Uniformly fine grinds also give less particle segregation and higher density of fills. Additionally, steam at about 90 p.s.i. to about 150 p.s.i. is employed to further compress or pack the coffee loaded within the columns. Steam packing allows additional coffee to be admitted to the column which is again steam packed. Roasted and ground coffee loaded into percolator columns is described by those skilled in the art as exhibiting a packed bed character.

A slack coffee bed results in mixing of extracts and channeling which reduces extraction efficiency and gives lower extract concentrations and lower solubles yields. The values of the snug high density vacuum fill of dry ground coffee are that the coffee bed is rigid, a swelling of 7 per cent after wetting further reduces void, and extract flow is through a uniformly supported bed and flow path. Prewetting of ground coffee before filling the column will reduce frequency of excessive pressure drop, but this type of slackness results in stale flavored coffee, looser beds with channeling and lower extract concentrations.

In commercial percolation processes extraction columns are completely filled with roasted and ground coffee and are sized such that the appropriate amount of coffee extract is produced. Further, commercial percolation processes are operated at cycle times, i.e., the time between successive draw-offs of coffee extract from the fresh stage, which are relatively short so as to more economically produce coffee extract. The coffee extract drying system is similarly fashioned to accommodate the maximum percolation output. The net result of this type of operation is a relatively fixed-capacity system. However, there often exists the need for operating a given percolator set at capacities below the maximum for which it was designed. It is further essential, of course, that the overall quality of the resultant coffee extract not be diminished.

SUMMARY OF THE INVENTION

It has been found that it is possible to operate a fixed-capacity percolator set at decreased capacities without encountering operational difficulties or coffee extract quality loss by loading the extraction columns of the percolator set with the amount of roasted and ground coffee to be extracted and filling the remaining area in the column with an inert packing material.

Various means of reducing the percolator output result in serious operational difficulties and/or a decrease in the quality of the resultant coffee extract. Loading the extraction columns with only that amount of roasted and ground coffee to be extracted leads to extremely troublesome operation. The coffee is loosely packed within the fixed-volume extraction column and results in a migration of coffee particles, particularly those of fine particle size which can lead to excessive pressure buildups. Further, the packed coffee will begin to separate on contact with the extraction liquid and move into the free spaces of the column. The resultant loss of the packed bed character leads to excessive channelling and bypassing of the coffee which results in extremely poor extraction of the soluble solids therefrom. There results uneconomical operation and a possible quality decrease since many flavorful coffee solids are left unextracted.

While reduced capacity can be achieved using a column completely filled with coffee by utilizing long cycle times, it has been found that operation in this manner is deleterious to the quality of the coffee extract due to the degradation of flavorful coffee solids during prolonged contact with hot extraction liquid.

According to this invention, however, it is possible to operate the percolator set at reduced capacity without encountering any of the above-mentioned problems.

DETAILED DESCRIPTION OF THE INVENTION

According to this invention, the percolator set is operated with its extraction columns completely filled to avoid pressure problems and uneconomical operation and at normal cycle times so as to avoid adversely affecting the quality of the coffee extract.

In general, it is possible according to this invention to operate at reduced capacities in the order of about 0.6 the normal fixed-volume capacity. This will require generally the utilization of packing material not in excess of about 35% by weight of the overall column load.

The inert packing material utilized in the process of this invention should contain little or no extractable material or characteristic odor which would adversely affect the flavor and aroma of the ultimate coffee extract. The material should be capable of being packed within the extraction column with a minimum of large void spaces. Suitable inert packing materials are the commonly-employed column packings such as Raschig rings, Berl saddles, Pall rings, Lessing rings, and the like. Examples of these are set out in Perry's Chemical Engineer's Handbook, 18-26 (4th ed. 1963, McGraw-Hill).

A particularly useful and our preferred packing material is spent coffee grounds defined as roasted and ground coffee which has been fully extracted during the percolation process. The spent coffee grounds should be dried and screened to break up any lumps of material before use in the extraction column. While by definition having little if any extractable material, the spent grounds may impart an undesirable aroma note to the coffee extract in some cases. Accordingly, it is preferred to "dearomatize" the spent coffee grounds prior to their use as a packing to remove all such extractable aromas and/or flavors. This may be suitably accomplished by contacting the spent coffee at temperatures in the range of 200° F to 300° F. It may also be preferred to first wash the spent coffee grounds to remove any extraction liquid that may be adhering thereon.

The amount of roasted and ground coffee to be extracted and the inert packing material may be interspersed in a random fashion within the extraction column. However, our preferred embodiment of this invention separates the packing material from the roasted and ground coffee which is to be extracted. Preferably, the extraction column is separately loaded such that the entering aqueous extraction liquid first contacts the inert packing material prior to contacting the roasted and ground coffee to be extracted. Thus for an extraction column operated in the upflow direction, the requisite amount of inert packing would be loaded into the bottom of the extraction column and then the roasted and ground coffee to be extracted is loaded thereon to fill the column.

It is found that this type operation is particularly useful where the inert packing material is spent coffee grounds. The effect of any aromas from the spent coffee being picked up by the extraction liquid and drawn off in the coffee extract is minimized by virtue of a "filtering" effect of sorts which the roasted and ground coffee to be extracted has on these aromas.

Further, regardless of the packing material, operation in the above manner is found to result in more efficient extraction of the roasted and ground coffee by virtue of the fact that uniform flow patterns are developed in the packing before contact with the roasted and ground coffee to be extracted.

The inert packing material may also be alternatively layered with the roasted and ground coffee to be extracted or loaded into both the top and bottom of the extraction column.

The roasted and ground coffee to be extracted may be decaffeinated or undecaffeinated coffee and may be a single coffee variety or a blend of coffee varieties. The aqueous extraction liquid, while generally water, may also be any solution of soluble solids such as salts or soluble coffee solids. The extraction liquid is generally heated to between 300° F to 350° F before being fed to the spent stage extraction column and it is generally desired to draw off coffee extract from the fresh stage extraction column at temperatures below about 220° F. Suitable intercolumn heaters or coolers may be employed according to well-known prior art processes to achieve this or any other desired temperature profile across the percolator set.

The following example will serve to more fully illustrate the process of this invention.

A percolator set comprised of six extraction columns capable of holding 1800 lbs. of roasted and ground coffee at normal operation is operated at a capacity 0.6 times the normal. The extraction columns of the percolator set are first loaded with 100 lbs. of spent coffee grounds and then with 1080 lbs. of roasted and ground coffee to be extracted in which is distributed an additional 376 lbs. of spent coffee grounds. The remainder of the extraction column is filled with 100 lbs. of spent coffee grounds, The total column load is 1656 pounds (owing to the fact that the spent coffee grounds have a 20% lower bulk density than the roasted and ground coffee to be extracted) of which 34.8% by weight is spent coffee grounds. The percolator set is then operated at standard cycle times (about 15 to 30 minutes) without experiencing operating difficulties or a decrease in the quality of the resultant coffee extract.

Numerous other reduced output rates can be achieved by varying the amounts of roasted and ground coffee to be extracted and the inert packing material. The ability to operate over a wide range of varying output rates greatly increases and enhances the flexibility of the percolation system.

The spent coffee grounds are prepared for use as the packing material in the following manner. A portion of the spent coffee removed from the spent stage extraction column after completion of a cycle is screened to remove any free liquid and then further washed with water to remove any adhering extraction liquid. The wet spent coffee grounds are then fed to a dryer and dried with hot air at about 200° F to 300° F to about 10% moisture. Any lumps of spent coffee grounds are then broken up and the grounds are screened to remove those particles which pass through an 8 mesh screen.

While the foregoing invention has been described with respect to specific examples and embodiments thereof they are presented for illustrative purposes. It is believed that various modifications and variations may be practiced without departing from the scope or spirit of the invention as defined by the appended claims.

I claim:

1. In a percolation process wherein roasted and ground coffee is loaded into a series of fixed volume extraction columns in a manner such that said roasted and ground coffee exhibits packed bed characteristics and is concurrently contacted with an aqueous extraction liquid, the improvement whereby uniform quality and operating characteristics are obtained at reduced output rates, said improvement comprising loading spent coffee grounds and roast ground coffee into said extraction columns to obtain a packed bed such that said aqueous extraction liquid entering said columns contacts said spent grounds prior to contacting the roasted and ground coffee to be extracted whereby said packed bed characteristics are maintained throughout the extraction process.

2. The process of claim 1 wherein said spent coffee grounds do not exceed about 35% by weight of the total column load.

* * * * *

UNITED STATES PATENT AND TRADEMARK OFFICE
CERTIFICATE OF CORRECTION

PATENT NO. : 4,048,345
DATED : September 13, 1977
INVENTOR(S) : Saul Norman Katz It is certified that error appears in the above-identified patent and that said Letters Patent are hereby corrected as shown below:

In column 1, line 15, change "lation" to -- lator -- .

In column 6, line 4, after "roast" insert -- and -- .

Signed and Sealed this

Second Day of May 1978

[SEAL]

Attest:

RUTH C. MASON
Attesting Officer

LUTRELLE F. PARKER
Acting Commissioner of Patents and Trademarks